(12) United States Patent
Baardman et al.

(10) Patent No.: US 9,945,972 B2
(45) Date of Patent: Apr. 17, 2018

(54) METHOD AND SYSTEM FOR SEPARATING SEISMIC SOURCES IN MARINE SIMULTANEOUS SHOOTING ACQUISITION

(71) Applicant: PGS Geophysical AS, Oslo (NO)

(72) Inventors: Rolf H. Baardman, Leiden (NL); Roald Gunnar van Borselen, Leiden (NL)

(73) Assignee: PGS Geophysical AS, Oslo (NO)

( * ) Notice: Subject to any disclaimer, the term of this patent is extended or adjusted under 35 U.S.C. 154(b) by 171 days.

(21) Appl. No.: 14/749,411

(22) Filed: Jun. 24, 2015

(65) Prior Publication Data

US 2015/0293250 A1    Oct. 15, 2015

Related U.S. Application Data

(63) Continuation of application No. 13/293,832, filed on Nov. 10, 2011, now Pat. No. 9,075,162.

(51) Int. Cl.
*G01V 1/36* (2006.01)
*G01V 1/38* (2006.01)

(52) U.S. Cl.
CPC .............. *G01V 1/3808* (2013.01); *G01V 1/36* (2013.01); *G01V 1/3861* (2013.01); *G01V 2210/324* (2013.01); *G01V 2210/52* (2013.01); *G01V 2210/56* (2013.01)

(58) Field of Classification Search
CPC ............................. G01V 1/006; G01V 1/3861
USPC ........................................................ 367/23
See application file for complete search history.

(56) References Cited

U.S. PATENT DOCUMENTS

| 3,676,841 | A | 7/1972 | Anstey |
| 4,458,339 | A | 7/1984 | Wason |
| 6,754,590 | B1 * | 6/2004 | Moldoveanu ......... G01V 1/006 367/56 |
| 6,906,981 | B2 | 6/2005 | Vaage |
| 8,837,255 | B2 | 9/2014 | Ross et al. |
| 9,213,119 | B2 * | 12/2015 | Eick .................... G01V 1/3808 |
| 2010/0299070 | A1 | 11/2010 | Abma |

(Continued)

FOREIGN PATENT DOCUMENTS

| EP | 2 141 514 A2 | 1/2010 |
| GB | 2 402 217 A | 12/2004 |

(Continued)

OTHER PUBLICATIONS

Womack, J.E., et al., "Encoding techniques for multiple source point seismic data acquisition," Geophysics, vol. 55, No. 10; Oct. 1990, pp. 1389-1396.

(Continued)

*Primary Examiner* — Ian J Lobo

(57) ABSTRACT

Seismic data are obtained by recording simultaneously in seismic streamer, acquired by activating approximately simultaneously two or more seismic sources towed at two positions in the vicinity of seismic streamers. A residual is updated iteratively for an inversion solution for the activations of the two or more seismic sources. The iterative updating of the residuals utilizes a sequence of overlapping temporal windows containing reflection events and utilizes normal moveout corrections based on largest reflection events in each temporal window. A final updated residual is added to a final updated model result.

25 Claims, 5 Drawing Sheets

(56) References Cited

U.S. PATENT DOCUMENTS

| | | |
|---|---|---|
| 2012/0014212 A1 | 1/2012 | Eick et al. |
| 2012/0014213 A1 | 1/2012 | Eick et al. |
| 2012/0073825 A1 | 3/2012 | Routh et al. |

FOREIGN PATENT DOCUMENTS

| | | |
|---|---|---|
| WO | 02/097474 A1 | 12/2002 |
| WO | 2010/093896 A2 | 8/2010 |

OTHER PUBLICATIONS

Xu, Sheng, et al., "On the orthogonality of anti-leakage Fourier transform based seismic trace interpolation," SEG Int'l Exposition and 74th Annual Meeting, Oct. 10-15, 2004.

Abma, Ray and Kabir, Nurul, "3D interpolation of irregular data with a POCS algorithm," Geophysics, vol. 71, No. 6, Nov.-Dec. 2006, pp. E91-E97.

Stefani, J., et al., "B006 Acquisition Using Simultaneous Sources," EAGE 69th Conference & Exhibition—London, UK Jun. 11-14, 2007.

Aaron, Peter, et al., "True-azimuth versus zero-azimuth 3-D multiple prediction in WATS processing," SEG Las Vegas 2008 Annual Meeting.

Berkhout, A.J. (Guus), et al., "From simultaneous shooting to blended acquisition," SEG Las Vegas 2008 Annual Meeting, pp. 2831-2838.

Fromyr, Eivind, et al., "Flam—A Simultaneous Source Wide Azimuth Test," SEG Las Vegas 2008 Annual Meeting, pp. 2821-2825.

Huo, Shoudong, et al., "Simultaneous Sources Separation via Multi-Directional Vector-Median Filter," SEG Houston 2009 International Exposition and Annual Meeting, pp. 31-35.

Abma, R.L., et al., "B003 High Quality Separation of Simultaneous Sources by Sparse Inversion," 72nd EAGE Conference & Exhibition incorporating SPE EUROPEC 2010.

Moore, I., "B001 Simultaneous Sources—Processing and Applications," 72nd EAGE Conference & Exhibition incorporation SPE EUROPEC 2010.

Doulgeris, P., et al., "B004 Separation of Blended Impulsive Sources using an Iterative Approach," 72nd EAGE Conference & Exhibition incorporating SPE EUROPEC 2010.

Blacquiere, G., et al., "B032 Acquisition Design for Incoherent Shooting," 72nd EAGE Conference & Exhibition incorporation SPE EUROPEC 2010.

Beasley, C., et al., "H030 A 30 Simultaneous Source Filed Test Processed by Active Separation," 73rd EAGE Conference & Exhibition incorporating SPE EUROPEC 2011, Vienna, Austria May 23-26, 2011.

Huo, S., et al., "H028 Deblending the simultaneous Source Data—Is it Necessary?", 73rd EAGE Conference & Exhibition incorporating SPE EUROPEC 2011, Vienna, Austria May 23-26, 2011.

\* cited by examiner

METHOD AND SYSTEM FOR SEPARATING SEISMIC SOURCES IN MARINE SIMULTANEOUS SHOOTING ACQUISITION

CROSS-REFERENCE TO A RELATED APPLICATION

This application is a continuation of U.S. patent application Ser. No. 13/293,832, filed Nov. 10, 2011.

BACKGROUND

In the oil and gas industry, geophysical prospecting is commonly used to aid in the search for and evaluation of subsurface earth formations. Geophysical prospecting techniques yield knowledge of the subsurface structure of the earth, which is useful for finding and extracting valuable natural resources, particularly hydrocarbon deposits such as oil and natural gas. A well-known technique of geophysical prospecting is a seismic survey. In a land-based seismic survey, a seismic signal is generated on or near the earth's surface and then travels downward into the subsurface of the earth. In a marine seismic survey, the seismic signal may also travel downward through a body of water overlying the subsurface of the earth. Seismic energy sources are used to generate the seismic signal which, after propagating into the earth, is at least partially reflected by subsurface seismic reflectors. Such seismic reflectors typically are interfaces between subterranean formations having different elastic properties, specifically sound wave velocity and rock density, which lead to differences in acoustic impedance at the interfaces. The reflected seismic energy is detected by seismic sensors (also called seismic receivers) at or near the surface of the earth, in an overlying body of water, or at known depths in boreholes. The seismic sensors generate signals, typically electrical or optical, from the detected seismic energy, which are recorded for further processing.

The appropriate seismic sources for generating the seismic signal in land seismic surveys may include explosives or vibrators. Marine seismic surveys typically employ a submerged seismic source towed by a ship and periodically activated to generate an acoustic wavefield. The seismic source generating the wavefield may be of several types, including a small explosive charge, an electric spark or arc, a marine vibrator, and, typically, a gun. The seismic source gun may be a water gun, a vapor gun, and, most typically, an air gun. Typically, a marine seismic source consists not of a single source element, but of a spatially-distributed array of source elements. This arrangement is particularly true for air guns, currently the most common form of marine seismic source.

The appropriate types of seismic sensors typically include particle velocity sensors, particularly in land surveys, and water pressure sensors, particularly in marine surveys. Sometimes particle displacement sensors, particle acceleration sensors, or pressure gradient sensors are used in place of or in addition to particle velocity sensors. Particle velocity sensors and water pressure sensors are commonly known in the art as geophones and hydrophones, respectively. Seismic sensors may be deployed by themselves, but are more commonly deployed in sensor arrays. Additionally, pressure sensors and particle motion sensors may be deployed together in a marine survey, collocated in pairs or pairs of arrays.

In a typical marine seismic survey, a seismic survey vessel travels on the water surface, typically at about 5 knots, and contains seismic acquisition equipment, such as navigation control, seismic source control, seismic sensor control, and recording equipment. The seismic source control equipment causes a seismic source towed in the body of water by the seismic vessel to actuate at selected times (the activation commonly known as a "shot"). Seismic streamers, also called seismic cables, are elongate cable-like structures towed in the body of water by the seismic survey vessel that tows the seismic source or by another seismic survey ship. Typically, a plurality of seismic streamers are towed behind a seismic vessel. The seismic streamers contain sensors to detect the reflected wavefields initiated by the seismic source and returning from reflective interfaces.

BRIEF DESCRIPTION OF THE DRAWINGS

The invention and its advantages may be more easily understood by reference to the following detailed description and the attached drawings, in which.

DETAILED DESCRIPTION

Figure 1:
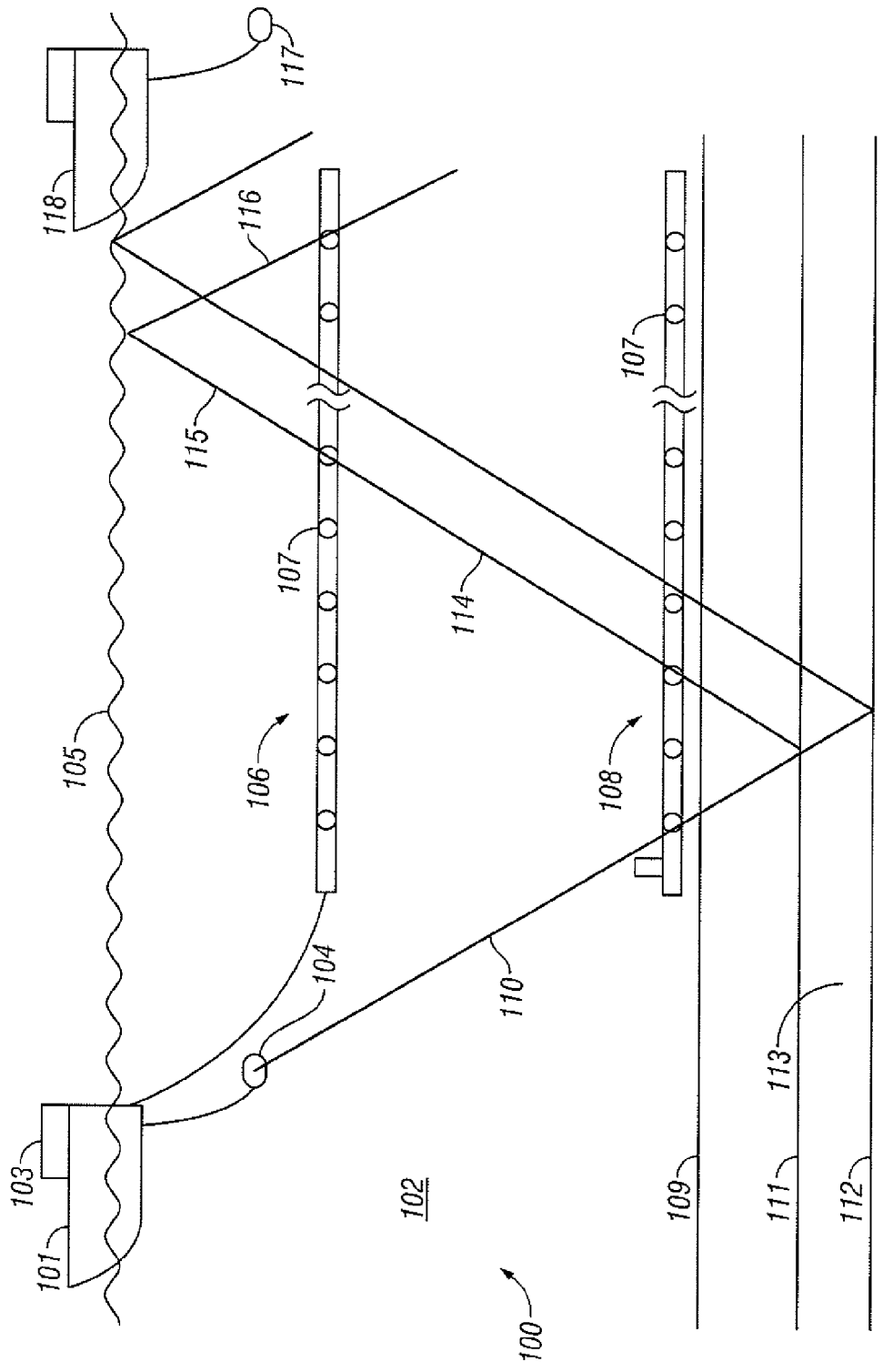
FIG. 1 is a diagram of an example system for acquiring seismic data suitable for use with embodiments of the invention.

FIG. 1 is a diagram of an example system for acquiring seismic data suitable for use with embodiments of the invention. In various embodiments, a single seismic sensor cable (also called a seismic streamer) or a single ocean bottom cable are shown for simplicity of illustration. This illustration of one cable is only meant to more clearly demonstrate principles of the invention and is not intended as a limitation of the invention. Multiple streamers or cables may also be used.

In FIG. 1, a seismic acquisition system is designated generally as 100. A seismic vessel 101 is disposed in a body of water 102 and carries equipment 103 for navigation, seismic source control, and seismic sensor recording. The seismic vessel 101 or another service vessel (not shown) tows a seismic source 104 through the body of water 102 below the surface 105 of the water. The seismic source 104 comprises any appropriate type of source, typically in arrays. In one embodiment, one or more seismic sources 104 are towed at the front of the seismic streamer 106 by the seismic vessel 101, while one or more seismic sources 117 are towed at the rear of the seismic streamer 106, for example, by another service vessel 118. The configuration of seismic sources 104 illustrated in the seismic acquisition system 100 is not intended to be a limitation of the invention. Other configurations of the seismic sources 104 may also be used.

In one embodiment, the seismic vessel 101 or another service vessel (not shown) tows a seismic streamer 106 through the body of water 102. The seismic streamer 106 comprises seismic sensors 107 at spaced apart positions along the seismic streamer 106, so that the seismic streamer 106 containing the seismic sensors 107 is disposed in the body of water 102. The seismic sensors 107 are typically pressure sensors, such as hydrophones. In another embodiment, the seismic streamer 106 comprises a dual-sensor streamer, in which the seismic sensors 107 comprise pairs of collocated pressure and particle motion sensors. The particle motion sensors are typically particle velocity sensors, such as geophones, or accelerometers. The seismic sensors 107 typically comprise arrays of sensors at each spaced apart position. An alternative to having the pressure and particle motion sensors co-located is to have sufficient spatial density of sensors so that the respective wavefields recorded by the pressure and particle motion sensors can be interpolated or extrapolated to produce the two wavefield signals at the same location.

In another embodiment, the seismic vessel 101 or another service vessel (not shown) disposes an ocean bottom cable 108 on the water bottom 109. The ocean bottom cable 108 also comprises seismic sensors 107 at spaced apart positions along the cable, also typically in arrays of sensors at each spaced apart position. The seismic sensors 107 in the ocean bottom sensor 108 can also comprise pairs of pressure and particle motion sensors. In yet another embodiment, both seismic streamers 106 and ocean bottom cable 108 are employed. The type of sensors illustrated in the seismic acquisition system 100 is not intended to be a limitation of the invention. For example, in other embodiments, discrete seismic sensors 107 located at ocean bottom nodes (not shown) or seismic sensors 107 located in vertical arrays or in bore holes (not shown) could be included in the seismic acquisition system 100. Other types of seismic sensors 107 and their arrangements may also be used.

When the seismic sources 104 are activated, acoustic energy travels downwardly, at 110, through the body of water 102 and the water bottom 109 to layer boundaries, such as 111 and 112, surrounding a subterranean formation layer, such as 113. A portion of the acoustic energy is reflected from the layer boundary at 111 and travels upwardly, at 114. The upwardly traveling acoustic energy 114 is detected at seismic sensors 107 on the ocean bottom cable 108 or the seismic streamer 106. The upwardly traveling acoustic energy continues upward, at 115, until reflecting off the water surface 105 and then travels downwardly again, at 116. The downwardly traveling acoustic energy 116 may be detected again by seismic sensors 107 on the seismic streamer 106 or the ocean bottom cable 108, resulting in a ghost signal. The acoustic energy detected at the seismic sensors 107 may be recorded onto any type of appropriate storage media at any location, such as, but not restricted to, at the seismic streamer 106 or the ocean bottom cable 108, on the seismic vessel 101 or another service vessel, or onshore.

Figure 2:
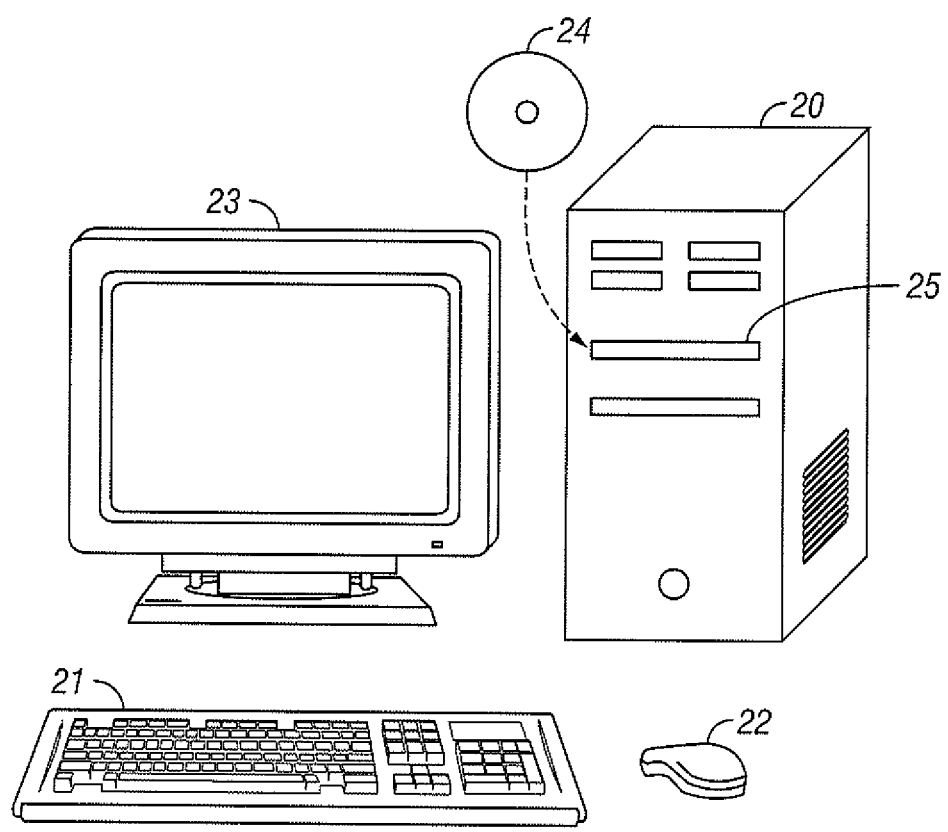
FIG. 2 is a diagram illustrating, by way of example, one of many different types of computer systems that can be used in accordance with embodiments of the invention.

FIG. 2 is a diagram illustrating, by way of example, one of many different types of computer systems that can be used in accordance with embodiments of the invention. A central processor 20 is coupled to user input devices, such as a keyboard 61 (wired or wireless) and a mouse 22 (wired or wireless). The processor 20 is further coupled to a display, such as a monitor 23. A computer program in accordance with embodiments of the invention may reside on any of a number of computer readable media, such as a disk 24 insertable into a disk drive 25 or on an internal or external hard drive (not shown).

As shown above in FIG. 1, marine seismic exploration typically employs a submerged seismic source 104 towed by a ship and periodically activated to generate an acoustic wavefield (the shot). The wavefield may be generated by a small explosive charge, an electric spark or arc, a vibrator, or, typically, a gun. The gun may be a water gun, vapor gun, or, most typically, an airgun. Each airgun contains a volume of air typically compressed to about 2000 psi (pounds per square inch) or more. An airgun abruptly releases its compressed air to create an air bubble, leading to an expanding sound wave in the water. The resulting wave front propagates downwardly into the earth beneath the water, reflects from subterranean earth layers, and returns upwardly toward the water surface.

In seismic exploration, there is continuous drive towards more dense data sampling to better image complex geological structures. Recent advances in acquisition such as Wide-Azimuth, Multi-Azimuth or Rich-Azimuth acquisition can deliver a more diverse range of source, azimuth and offset sampling. To collect such data, multiple seismic service vessels to source and receiver vessels are deployed, thereby increasing the costs of the survey significantly.

In conventional acquisition, there is zero time overlap between shot records, and seismic data are recorded discontinuously. As a result, the seismic source domain is often poorly sampled, leading to aliasing. In simultaneous shooting acquisition, data can be recorded continuously, and temporal overlap between shots is allowed. As a result, more sources are fired during the same period of acquisition, which enhances the flexibility in survey geometries. As a result, a more densely sampled data set in terms of source spacing, but also azimuth and offset distributions, can be obtained. The resulting recorded shot records are also referred to as "blended" shot records.

In terms of efficiency, simultaneous acquisition can contribute by reducing survey times, which is of particular value in critical situations where small acquisition time-windows dominate due to severe safety, environmental, or economic restrictions.

The simultaneous firing of marine seismic sources can provide significant advantages in seismic acquisition efficiency. However, each source is affected by the seismic interference from one or more other sources. This interference associated with each seismic source needs to be accounted for so that effective processing techniques can be applied to the acquired seismic data to separate the sources in the seismic data.

The randomization of seismic source timing allows for the attenuation of the energy from interfering sources after sorting the acquired data to a domain that makes it possible to align the contributions from one specific source to zero time, while the other source(s) will appear to be incoherent. As a result, methods that can discriminate between coherent and incoherent energy allow for the sources to be separated.

Using techniques in accordance with embodiments of the invention, two or more sources may be separated, or "deblended", by being constructed through minimization of a cost function. The cost function describes the size of the residual, or misfit between the input data and the modeled data. How to use the cost function to calculate an iterative solution for the inversion on a sequence of overlapping temporal windows will be described below in example embodiments of the invention.

One embodiment includes a method to separate seismic sources in seismic data that was acquired using marine simultaneous shooting acquisition. Using matrix notation, seismic data can be represented by a data matrix P, with its columns representing shot records and its rows representing receiver gathers. Hence, element $P_{ij}$ represents a single trace related to source position j and detector position i. The position of each element in the P matrix corresponds to the spatial coordinates of the sources and receivers; with different rows corresponding to different detector numbers and different columns corresponding to different experiments, i.e., shot records. In general, seismic source blending can be formulated as follows:

$$P'(z_d, z_s) = P(z_d, z_s)\Gamma, \quad (1)$$

where P' is the blended data matrix, and $z_d$, and $z_s$ are the detector and source depth levels, respectively. Blending matrix $\Gamma$ contains the blending parameters. In the case of a marine survey with random firing times but equal source strengths, only phase encoding is utilized. In this case, the blending elements $\Gamma r_{kl}$ consist only of phase terms exp $(-j\omega\tau_{kl})$ that express the time delay $\tau_{kl}$ given to source k in blended source array l.

To retrieve individual 'deblended' shot records from the blended data matrix P', a matrix inversion has to be performed. In general, the blending problem is underdetermined (i.e., P' has less columns than P), meaning that unique solutions to the inverse problem do not exist. Hence, the blending matrix $\Gamma$ is not invertible.

A goal, also known as an objective function, may be defined for the inverse problem. The goal is a functional (i.e. a map from a vector space to the field underlying the vector space) that measures how close the deblended data, represented by vector m, from the recovered model fits the blended input data d. The standard objective function is usually of the form:

$$\Phi(m_1, m_2) = \|m\Gamma - d\|_2^2, \quad (2)$$

which represents the $L_2$ norm of the residual, which is defined as the misfit between the recorded blended data d and the predicted blended data $m\Gamma$, that can be constructed from the predicted deblended data m. Note that an $L_2$ norm is used here as a generic measurement of the distance between the predicted data and the observed data, but that other norms are also possible for use. Additionally, this embodiment is illustrated with two sources, but this is not a restriction of the invention. Two or more sources may be used.

The goal of the objective function is to minimize the difference between the predicted and observed data. To minimize the objective function (i.e. solve the inverse problem), the gradient of the objective function is computed, using the same rationale to minimize a function of only one variable. The gradient of the objective function in Equation (2), set equal to zero, is:

$$\nabla_\varphi = m\Gamma\Gamma^H - d\Gamma^H = 0, \quad (3)$$

which simplifies after rearrangement into the least squares solution:

$$m = d\Gamma^H(\Gamma\Gamma^H)^{-1}, \quad (4)$$

In the marine case, blending matrix r only contains phase terms (phase encoding). As a result, its least-squares inverse corresponds to the transpose complex conjugate (Hermitian). The application of the transpose complex Hermitian, designated by a superscript "H", to the blended input data then leads to "pseudo-deblended" shot gathers:

$$m = d\Gamma^H \quad (5)$$

From the physics point of view, the "pseudo-deblending" process carries out an expansion corresponding to the number of seismic sources that are blended together. For example, if this number of sources is b, each blended shot record is copied b times. Then, each of these shot record copies is corrected for the corresponding time delays introduced in the field or decoded in the case of encoded sources (correlation). This corresponds to simply correcting each shot to its own time zero. Since the responses of multiple sources are included in a single blended shot record and the source codes are not orthogonal, the "pseudo-deblending" process generates correlation noise. This correlation noise is known as 'blending noise' or 'cross talk". Nevertheless, these pseudo-deblended shot records serve a purpose in further processing, either as end-product after separation, or as input for a subsequent source separation method to be applied.

An alternative to the least squares solution is to impose constraints on the possible solutions by emphasizing certain possible features in our models. This type of constraint technique is known as regularization.

One approach to regularization is to constrain the inversion by enforcing sparseness to some convenient domain (for example, radon transformed CMP-gathers). However, such schemes are known to have at least the following drawbacks. Enforcing sparseness not only suppresses the blending noise but, unfortunately, also suppresses the weaker reflection events. Even in the Radon domain (stacking power for the coherent events), the weaker reflection events cannot be distinguished from the blending noise. Further, reflection events are typically too complex to be described by only a few Radon parameters, since the result is not sparse enough.

An alternative to using sparseness constraints is using coherency constraints. In such methods, incoherent energy recognized as a representation of coherent events belonging to (one of) the interfering shots. The inversion approach aims to distribute all energy in the blended shot records by reconstructing the individual unblended shot records at their respective locations.

In example embodiments, a method may be used that constrains the inversion by imposing that the recorded wave-field is regular, i.e. that nearby sources produce records that are similar to each other in the sense that the desired records m contain data that are, at least locally, predictable and contain coherent events. Various methods exist to separate coherent signal from the incoherent interference from the overlapping shots, e.g. multi-dimensional F-X deconvolution, but alternative methods may also be utilized.

To aid in the separation of coherent from incoherent energy, an NMO-correction can be used to flatten the events such that they become more parabolic. However, an extensive velocity profile that aims to flatten all events will result in stretch effects that may be severe. At the same time, a simple velocity model (for example, very smooth and with low velocities) will yield less severe stretching effects, but will not flatten all events as desired.

To overcome this problem, it is proposed to build up the deblended shot records using overlapping temporal windows. In the first update step, the water bottom reflection is considered, where a NMO correction with the water-velocity is applied to all pseudo-deblended gathers. Typically, the NMO correction is applied after sorting the seismic data to a Common Depth Point (CDP) domain in order to flatten the reflection events as much as possible. Note that only minimal stretch effects are introduced by doing so, because a constant velocity is used.

To extract the coherent signals from the NMO-corrected data gathers, a multi-dimensional median filter may be utilized. The type of filter utilized is not limited to median filters. The type of filter utilized may include, but is not limited to, other filters such as frequency-wavenumber filters, Radon filters, and curvelet or wavelet domain filters. Subsequently, an inverse NMO is applied to the retrieved signals, after which the time-delays are applied, the results are summed and subtracted from the residual. The residual will then serve as input for next update, progressively expanding the temporal window of interest, thereby using an appropriate NMO correction for the extended temporal window under consideration.

One advantage of the temporal windowing approach is that it is capable of aligning the target events with less stretch effects. Furthermore, it allows for the removal of strong incoherent spikes from the shallow data first, so that extracting coherent energy is easier when the process is repeated for larger arrival times, i.e. for deeper events. The invention is not limited to using time window constrained NMO corrections. Other methods, such as static shifts, could be employed to avoid stretch effects.

The proposed multi-dimensional median filter improves the separation of any overlapping events, i.e. a reflection event and an overlapping blending noise spike. By utilizing a median filter, the blending noise is reduced significantly. The target event may not be reconstructed completely in a single iteration, but the remaining reflection information still resides in the residual data, that is, it hasn't leaked to the wrong shot. As such, the remnant reflection energy can still be added in subsequent iterations. A similar, conservative principle is used for weaker or less aligned events. The application of aggressive extraction filters should be avoided to ensure that, if an event is not added to the correct deblended gather, it is also not added to the wrong gather. After the last iteration, the residual is added to all deblended gathers to ensure that no relevant information was lost.

The inversion approach starts by computing pseudo-deblended data gathers, obtained as a scaled version of the least squares solution to minimizing the objective, or cost, function $\Phi(m_1 \ldots, m_N)$:

$$\Phi(m_1, \ldots, m_N) = \|m\Gamma - d\|_2^2, \quad (6)$$

Here, d is blended input data (as originally measured) and $m = [m_1, \ldots m_N]^T$ constitutes the N deblended data gathers in the time domain and $\| \|_2$ represents the $L_2$ or Euclidean norm (distance function).

In the first update step, an NMO correction using the water velocity is applied to all pseudo-deblended gathers. Note again that only minimal stretch effects are introduced doing so because a constant velocity is used. Next, a temporal window is considered that contains the flattened water bottom reflection event. Then, a multi-dimensional median filter is used to extract the coherent signals. Subsequently, an inverse NMO is applied to the retrieved signals, after which the time-delays are applied; the results are summed and subtracted from the residual. The residual will then serve as input for next update, progressively expanding the temporal window of interest.

Initially, the models are empty and, thus, from Equation (6), the initial residual $r_{(0)}$ equals the blended input data d. In the $i^{th}$ iteration, the $i^{th}$ residual $r_{(i)}$ is given by:

$$r_{(i)} = d - m_{(i)}\Gamma. \quad (7)$$

Models $m_1$ through $m_N$ for the separated sources are built up iteratively, where in each subsequent iteration, a larger temporal window is considered, focusing on the next (deeper) strong reflection event. This procedure is repeated until all events in the seismic data have been reconstructed. After the iterative scheme has been completed, the residual data are added to the deblended data sets $m_1, \ldots, m_N$.

The NMO correction is typically applied in the Common Depth Point (CDP) domain, and as such, this domain is convenient for computing the residual and reconstructing the models $m_1, \ldots, m_N$. However, the invention is not limited to this choice of gathers. The process can also be applied to other gathers, such as common source or common receiver gathers.

The proposed multi-dimensional median filter will have an averaging/smoothing effect on the events which is good to separate overlapping events. Otherwise, a reflection event and the overlapping blending noise spikes (belonging to coherent events in the other shot) will be both added to the update (leakage, seen as gaps in the other shot). The target event might not be removed completely this way (the remaining is still in the residual data, so not leaked). However, the corresponding blending noise is reduced significantly such that, in a later iteration, a deeper and weaker event can be filtered out as well and added to the correct deblended gather. As long as events are in the residual, the events have not leaked to the wrong shot and can be added afterwards. The same conservative principle can be used for weaker or less aligned events. Too aggressive filters should not be used to ensure that, if an event is not added to the correct deblended gather, the event is also not added to the wrong gather. As a result, after updating, the residual must be added to all deblended gathers, giving a slightly more noisy output.

Figure 3:
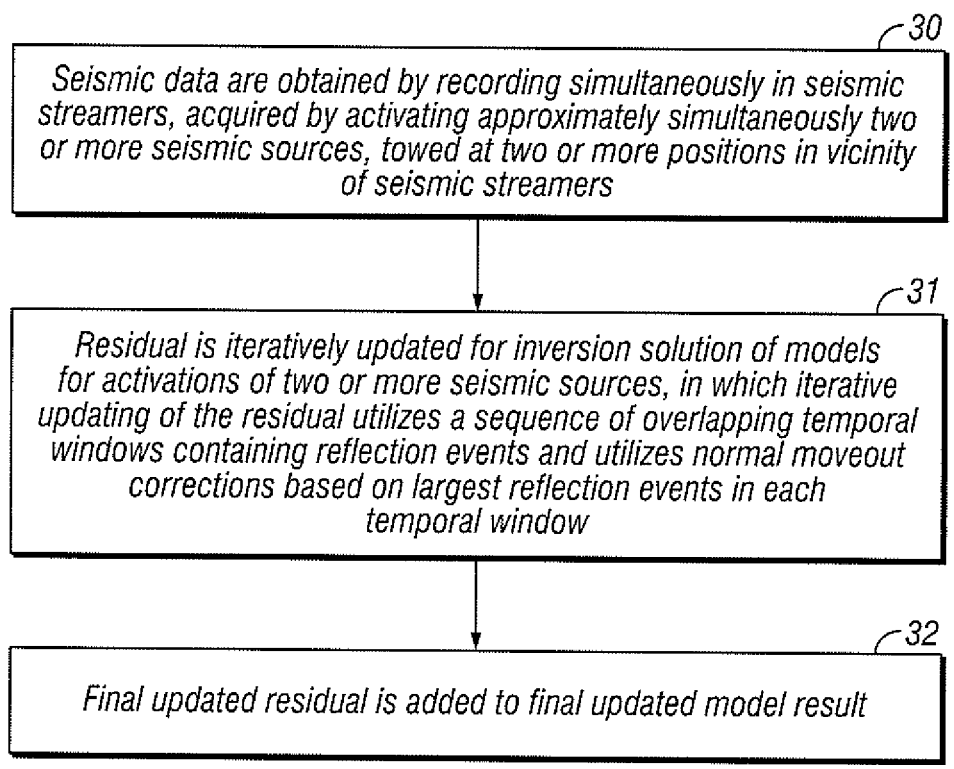
FIG. 3 is a flowchart illustrating an example embodiment of a method for separating seismic sources in marine simultaneous shooting acquisition.

FIG. 3 is a flowchart illustrating an example embodiment of a method for separating the effects of seismic sources in simultaneous shooting acquisition.

At block 30, seismic data are obtained by recording simultaneously in seismic streamers, acquired by activating approximately simultaneously two or more seismic sources, towed at two or more positions in vicinity of seismic streamers.

At block 31, a residual is iteratively updated for an inversion solution of models for the activations of the two or more seismic sources from block 30. The iterative updating of the residual utilizes a sequence of overlapping temporal windows containing reflection events and utilizes normal moveout corrections based on largest reflection events in each temporal window.

At block 32, a final updated residual from block 31 is added to a final updated model result from block 31.

Figure 4:
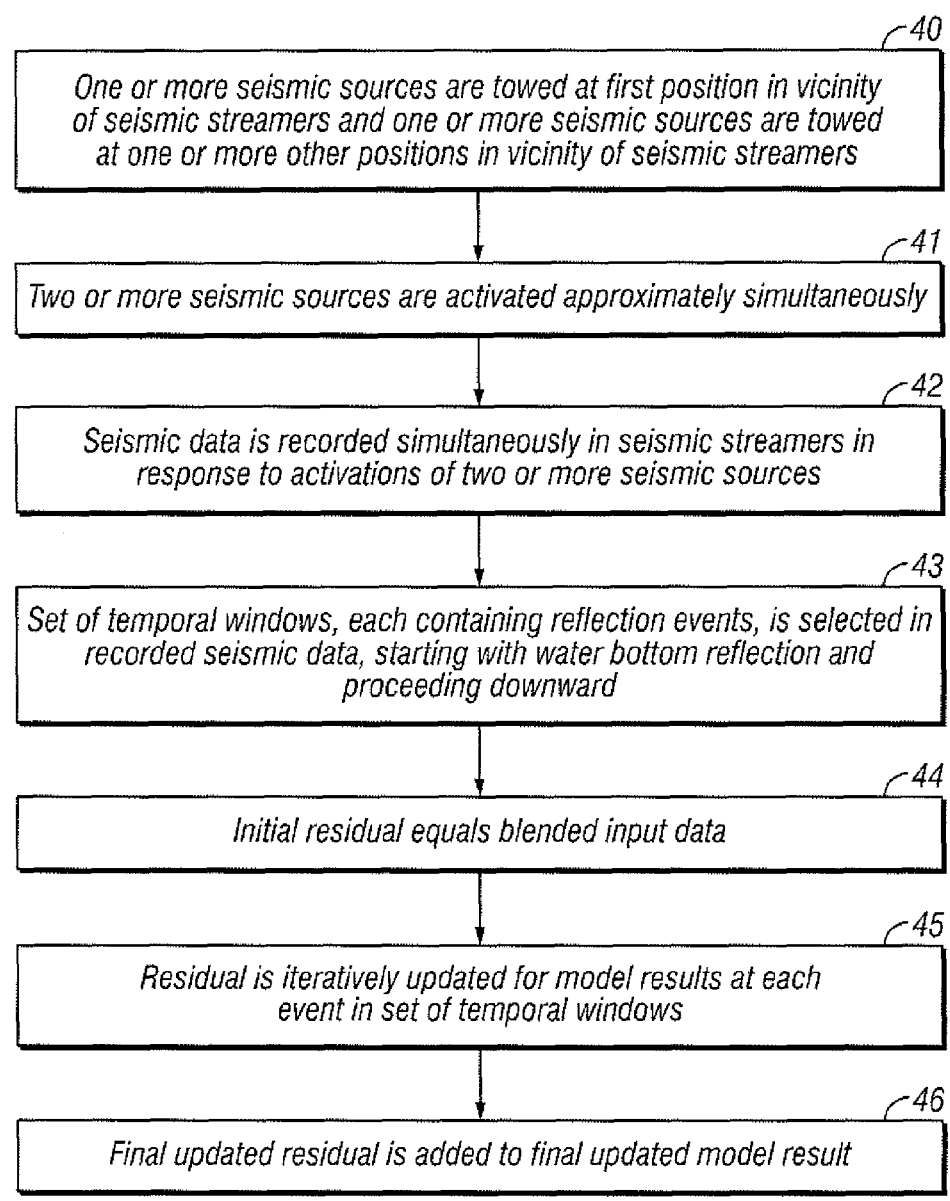
FIG. 4 is a flowchart illustrating an example embodiment of a method for an iterative inversion solution of models for the activation of two or more seismic sources.

FIG. 4 is a flowchart illustrating an example embodiment of a method for an iterative inversion solution of models for the activation of two or more seismic sources.

At block 40, one or more seismic sources are towed at a first position in the vicinity of seismic streamers and one or more seismic sources are towed at one or more other positions in the vicinity of the seismic streamers. In one embodiment, the first position can be at the front of the seismic streamers and another position can be at the rear of the seismic streamers. However, the invention is not intended to be restricted to these positions.

At block 41, the two or more separated seismic sources from block 40 are activated approximately simultaneously. Random time delays of −500 ms to +500 ms are applied to the timing of the activation of the two or more seismic sources.

At block 42, seismic data is recorded in the seismic streamers in response to the seismic source activations in block 41. The responses to the two or more seismic sources are recorded simultaneously.

At block 43, a set of temporal windows, each containing reflection events, is selected in the seismic data recorded in block 42, starting with the water bottom reflection and proceeding downward. Let the number of temporal windows be designated as N. These temporal windows do not have to follow the recorded reflection events or any sub-surface reflectors. The temporal windows may reflect isochrones or pseudo-boundaries representing windows in time, specified only by a window length.

At block 44, at initial iterative step 0, deblended model results $m_{(0)}$ are set equal to zero. Thus, the initial residual $r_{(0)}$ equals the blended input data d from block 42.

At block 45, at each iterative step i, from i=1, 2, . . . , N, the residual $r_{(i)}$ is updated for an inversion solution of model results $m_{(i)}$ at the $i^{th}$ event in the selected set of temporal windows from block 43.

At block 46, after the final iterative step, the final updated residual $r_{(N)}$ from block 45 is added to the model result $m_{(N)}$.

Figure 5:
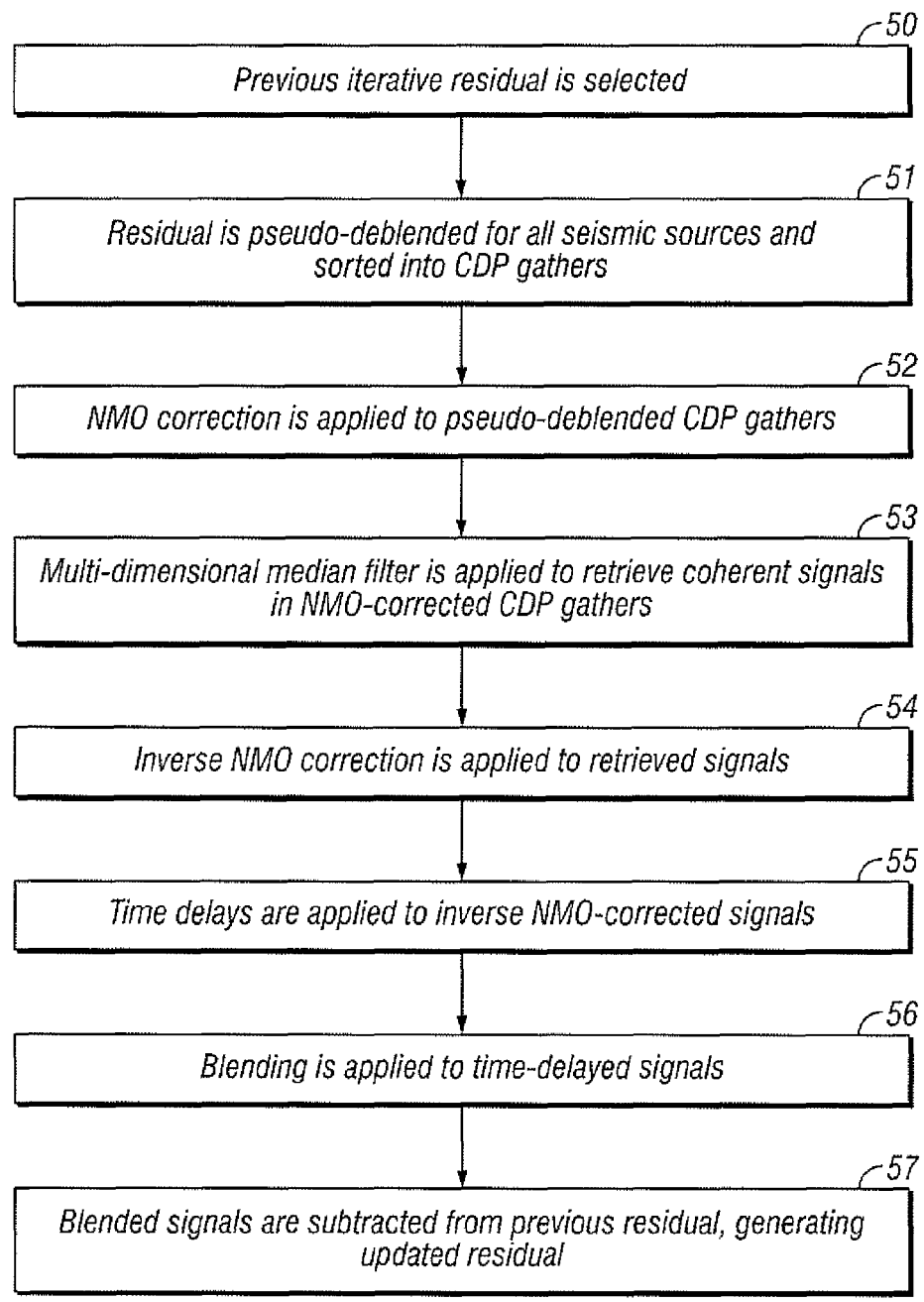
FIG. 5 is a flowchart illustrating an example embodiment of a method for iteratively updating a residual.

FIG. 5 is a flowchart illustrating an example embodiment of a method for iteratively updating the residual. This flowchart describes in more detail the iterative step in the process referred to in block 45 of FIG. 4.

At block 50, the previous $(i-1)^{th}$ iterative residual $r_{(i-1)}$ is taken from block 45 in FIG. 4.

At block 51, the residual $r_{(i-1)}$ from block 50 is pseudo-deblended for the two or more seismic sources from block 40 of FIG. 4 and sorted into CDP gathers.

Because two or more sources are fired with only small random time delays in between, the responses of the sources are recorded at the same time. Deblending the seismic data means that the data for one source are aligned by re-applying the random time delays and then that part of the data (blending noise) that was ignited by the other sources are removed. Pseudo deblending means that the data is only aligned for the desired source, while the blending noise is untainted.

At block 52, an NMO-correction is applied to the pseudo-deblended CDP gathers from block 51. Although this NMO correction may work best on CMP gathers, the invention is not restricted to this choice of gather. The process can also be applied to other gathers, such as common source or common receiver gathers.

At block 53, a multi-dimensional median filter is applied to retrieve the coherent signals in the NMO-corrected CDP gathers from block 52. A temporal window can be used to limit the area where the filter is active.

At block 54, an inverse NMO correction is applied to the retrieved signals from block 53.

At block 55, the random time delays from block 41 of FIG. 4 are applied to the inverse NMO-corrected signals from block 54.

At block 56, blending is applied to the time-delayed signals from block 55.

At block 57, the blended signals from block 56 are subtracted from the previous residual $r_{(i-1)}$ to generate the new residual $r_{(i)}$.

The seismic data obtained in performing a seismic survey, representative of earth's subsurface, are processed to yield information relating to the geologic structure and properties of the subsurface earth formations in the area being surveyed. The processed seismic data are processed for display and analysis of potential hydrocarbon content of these subterranean formations. The goal of seismic data processing is to extract from the seismic data as much information as possible regarding the subterranean formations in order to adequately image the geologic subsurface. In order to identify locations in the earth's subsurface where there is a probability for finding petroleum accumulations, large sums of money are expended in gathering, processing, and interpreting seismic data. The process of constructing the reflector surfaces defining the subterranean earth layers of interest from the recorded seismic data provides an image of the earth in depth or time. A prerequisite for discovery of any oil or gas reservoir is a well-resolved seismic image of the earth's subsurface.

The image of the structure of the earth's subsurface is produced in order to enable an interpreter to select locations with the greatest probability of having petroleum accumulations. To verify the presence of petroleum, a well must be drilled. Drilling wells to determine whether petroleum deposits are present or not, is an extremely expensive and time-consuming undertaking. For that reason, there is a continuing need to improve the processing and display of the seismic data, so as to produce an image of the structure of the earth's subsurface that will improve the ability of an interpreter, whether the interpretation is made by a computer or a human, to assess the probability that an accumulation of petroleum exists at a particular location in the earth's subsurface. The processing and display of acquired seismic data facilitates more accurate decisions on whether and where to drill, and thereby reduces the risk of drilling dry holes.

Embodiments in accordance with the invention have been discussed above as methods, for illustrative purposes only. Embodiments can also be implemented as systems. Systems in accordance with embodiments of the invention may, for example, be implemented by means of computers, in particular digital computers, along with other conventional data processing equipment. Such data processing equipment, well known in the art, may comprise any appropriate combination or network of computer processing equipment, including, but not be limited to, hardware (processors, temporary and permanent storage devices, and any other appropriate computer processing equipment), software (operating systems, application programs, mathematics program libraries, and any other appropriate software), connections (electrical, optical, wireless, or otherwise), and peripherals (input and output devices such as keyboards, pointing devices, and scanners; display devices such as monitors and printers; computer readable storage media such as tapes, disks, and hard drives, and any other appropriate equipment).

A computer program may be stored in a computer readable medium, with the program having logic operable to cause a programmable computer to perform any of the methods described above.

It should be understood that the preceding is merely a detailed description of specific embodiments of this invention and that numerous changes, modifications, and alternatives to the disclosed embodiments can be made in accordance with the disclosure here without departing from the scope of the invention. The preceding description, therefore, is not meant to limit the scope of the invention. Rather, the scope of the invention is to be determined only by the appended claims and their equivalents.

The invention claimed is:

1. In a process for generating an image of geological structures of a subterranean formation using marine seismic techniques in which two or more sources activated at different source positions and with a random time delay between each activation, the reflections from the subterranean formation recorded as blended seismic data having one or more traces, each trace records seismic data generated by a detector in response to activation of the two or more sources, the specific improvement consisting of:

forming a blending matrix, each blending matrix element represents a phase associated with the random time delay between activation of the two or more sources;

for each temporal window in a sequence of overlapping temporal windows containing reflection events recorded in the blended seismic data, minimizing a residual between the blended seismic data and a product of predicted deblended seismic data models and the blending matrix;

adding a final updated residual to a final updated deblended seismic data model to obtain the deblended seismic data, each trace of the deblended seismic data relates to a seismic response at a detector position to acoustic energy generated by one of the two or more sources at a source position; and using the deblended seismic data in generating an image of the subterranean formation, thereby enhancing the image of subterranean earth layer layers.

2. The process of claim 1, wherein activation of the two or more sources at different positions further comprises one of the two or more sources located in front of the detector.

3. The process of claim 1, wherein minimizing the residual further comprises:

determining the sequence of temporal windows such that each temporal window contains reflection events in the blended seismic data recorded, starting with a water bottom reflection and proceeding downward;

initializing a deblended seismic data model to zero;

updating, at each iterative step the residual for an inversion solution of a deblended seismic data model at an event in the sequence of temporal windows; and adding, after the final iterative step, the final updated residual to the final updated deblended seismic data model.

4. The process of claim 3, wherein updating the residual at each iterative step further comprises:

pseudo-deblending a previous residual for the two or more sources to generate pseudo-deblended common depth point ("CDP") gathers as a product of the blended seismic data multiplied by a conjugate transpose of the blending matrix;

applying a normal moveout ("NMO")-correction to the pseudo-deblended CDP gathers;

applying a filter to retrieve coherent signals in the NMO-corrected CDP gathers;

applying an inverse NMO correction to the retrieved coherent signals;

applying the random time delays to the inverse NMO-corrected signals;

blending to the time-delayed signals; and subtracting the blended time-delayed signals from the previous residual to generate a residual for a current iteration.

5. The process of claim 4, wherein applying the filter further comprises applying a multi-dimensional median filter.

6. The process of claim 5, wherein the applying a multi-dimensional median filter further comprises using a temporal window to limit the area where the multi-dimensional median filter is active.

7. The process of claim 4, wherein applying the filter further comprises applying one of a frequency-wavenumber filter, Radon filter, curvelet filter and a wavelet domain filter.

8. The process of claim 3, wherein updating the residual utilizes a static shift.

9. The process of claim 1, wherein the deblended seismic data further comprises storing the deblended seismic data on a computer readable medium.

10. A non-transitory computer readable medium having machine-readable instructions encoded thereon for enabling one or more processors of a computer system to perform the operations of:

receiving recorded blended seismic data having one or more traces, each trace records seismic data generated by a detector in response to seismic energy created by activation of two or more sources at different source positions and with a random time delay between each activation;

forming a blending matrix, each blending matrix element represents a phase associated with the random time delay between activation of the two or more sources;

for each temporal window in a sequence of overlapping temporal windows containing reflection events recorded in the blended seismic data, minimizing a residual between the recorded blended seismic data and a product of predicted deblended seismic data models and the blending matrix;

adding a final updated residual to a final updated deblended seismic data model to obtain the deblended seismic data, each trace of the deblended seismic data relates to a seismic response at a detector position to acoustic energy generated by one of the two or more sources at a source position; and using the deblended seismic data in generating an image of the subterranean formation, thereby enhancing the image of subterranean earth layer layers.

11. The medium of claim 10, wherein activation of the two or more sources at different positions further comprises one of the two or more sources located in front of the detector.

12. The medium of claim 10, wherein minimizing the residual further comprises:

determining the sequence of temporal windows such that each temporal window contains reflection events in the blended seismic data recorded, starting with a water bottom reflection and proceeding downward;

initializing a deblended seismic data model to zero;

updating, at each iterative step the residual for an inversion solution of a deblended seismic data model at an event in the sequence of temporal windows; and adding, after the final iterative step, the final updated residual to the final updated deblended seismic data model.

13. The medium of claim 12, wherein updating the residual at each iterative step further comprises:

pseudo-deblending a previous residual for the two or more sources to generate pseudo-deblended common depth point ("CDP") gathers as a product of the blended seismic data multiplied by a conjugate transpose of the blending matrix;

applying a normal moveout ("NMO")-correction to the pseudo-deblended CDP gathers;

applying a filter to retrieve coherent signals in the NMO-corrected CDP gathers;

applying an inverse NMO correction to the retrieved coherent signals;

applying the random time delays to the inverse NMO-corrected signals;

blending to the time-delayed signals; and subtracting the blended time-delayed signals from the previous residual to generate a residual for a current iteration.

14. The medium of claim 13, wherein applying the filter further comprises applying a multi-dimensional median filter.

15. The medium of claim 14, wherein the applying a multi-dimensional median filter further comprises using a temporal window to limit the area where the multi-dimensional median filter is active.

16. The medium of claim 13, wherein applying the filter further comprises applying one of a frequency-wavenumber filter, Radon filter, curvelet filter and a wavelet domain filter.

17. The medium of claim 12, wherein updating the residual utilizes a static shift.

18. A computer system programmed to generate an image of geological structures of a subterranean formation from blended seismic data, the system comprising:
    one or more processors;
    one or more computer readable media; and
    machine readable instructions stored in the one or more computer readable media that when executed by the one or more processors controls the system to carry out
        receiving recorded blended seismic data having one or more traces, each trace records seismic data generated by a detector in response to seismic energy created by activation of two or more sources at different source positions and with a random time delay between each activation;
        forming a blending matrix, each blending matrix element represents a phase associated with the random time delay between activation of the two or more sources;
        for each temporal window in a sequence of overlapping temporal windows containing reflection events recorded in the blended seismic data, minimizing a residual between the blended seismic data and a product of predicted deblended seismic data models and the blending matrix;
        adding a final updated residual to a final updated deblended seismic data model to obtain the deblended seismic data, each trace of the deblended seismic data relates to a seismic response at a detector position to acoustic energy generated by one of the two or more sources at a source position; and
        using the deblended seismic data in generating an image of the subterranean formation, thereby enhancing the image of subterranean earth layer layers.

19. The computer system of claim 18, wherein activation of the two or more sources at different positions further comprises one of the two or more sources located in front of the detector.

20. The computer system of claim 18, wherein minimizing the residual further comprises:
    determining the sequence of temporal windows such that each temporal window contains reflection events in the blended seismic data recorded, starting with a water bottom reflection and proceeding downward;
    initializing a deblended seismic data model to zero;
    updating, at each iterative step the residual for an inversion solution of a deblended seismic data model at an event in the sequence of temporal windows; and
    adding, after the final iterative step, the final updated residual to the final updated deblended seismic data model.

21. The computer system of claim 20, wherein updating the residual at each iterative step further comprises:
    pseudo-deblending a previous residual for the two or more sources to generate pseudo-deblended common depth point ("CDP") gathers as a product of the blended seismic data multiplied by a conjugate transpose of the blending matrix;
    applying a normal moveout ("NMO")-correction to the pseudo-deblended CDP gathers;
    applying a filter to retrieve coherent signals in the NMO-corrected CDP gathers;
    applying an inverse NMO correction to the retrieved coherent signals;
    applying the random time delays to the inverse NMO-corrected signals;
    blending to the time-delayed signals; and
    subtracting the blended time-delayed signals from the previous residual to generate a residual for a current iteration.

22. The computer system of claim 21, wherein applying the filter further comprises applying a multi-dimensional median filter.

23. The computer system of claim 22, wherein the applying a multi-dimensional median filter further comprises using a temporal window to limit the area where the multi-dimensional median filter is active.

24. The computer system of claim 21, wherein applying the filter further comprises applying one of a frequency-wavenumber filter, Radon filter, curvelet filter and a wavelet domain filter.

25. The computer system of claim 20, wherein updating the residual utilizes a static shift.

* * * * *